(12) United States Patent
Broyles et al.

(10) Patent No.: US 9,006,315 B2
(45) Date of Patent: Apr. 14, 2015

(54) THERMOPLASTIC STARCH COMPOSITIONS

(71) Applicant: The Procter & Gamble Company, Cincinnati, OH (US)

(72) Inventors: Norman Scott Broyles, Hamilton, OH (US); Pier-Lorenzo Caruso, Frankfurt Am Main (DE); Emily Charlotte Boswell, Cincinnati, OH (US); Robert Earl Magness, Cincinnati, OH (US); Ludwig Busam, Schwalbach (DE); Jorg Harren, Krefeld (DE); Laurent Wattebled, Krefeld (DE)

(73) Assignee: The Procter & Gamble Co, Cincinnati, OH (US)

( * ) Notice: Subject to any disclaimer, the term of this patent is extended or adjusted under 35 U.S.C. 154(b) by 0 days.

(21) Appl. No.: 14/293,424

(22) Filed: Jun. 2, 2014

(65) Prior Publication Data
US 2014/0275356 A1 Sep. 18, 2014

Related U.S. Application Data

(62) Division of application No. 13/301,926, filed on Nov. 22, 2011, now Pat. No. 8,772,378.

(60) Provisional application No. 61/416,399, filed on Nov. 23, 2010.

(51) Int. Cl.
| | |
|---|---|
| *C08L 3/00* | (2006.01) |
| *D21H 19/58* | (2006.01) |
| *C08L 23/06* | (2006.01) |
| *C08L 3/02* | (2006.01) |
| *C08K 5/092* | (2006.01) |
| *C08K 5/098* | (2006.01) |
| *C08K 5/41* | (2006.01) |
| *C08L 23/12* | (2006.01) |
| *C08L 67/02* | (2006.01) |

(52) U.S. Cl.
CPC . *C08L 23/06* (2013.01); *C08L 3/00* (2013.01); *C08L 3/02* (2013.01); *C08K 5/092* (2013.01); *C08K 5/098* (2013.01); *C08K 5/41* (2013.01); *C08L 23/12* (2013.01); *C08L 67/02* (2013.01)

(58) Field of Classification Search
USPC .......................................................... 524/47
See application file for complete search history.

(56) References Cited

U.S. PATENT DOCUMENTS

| | | | |
|---|---|---|---|
| 4,244,780 A | 1/1981 | Rende et al. | |
| 5,280,055 A | 1/1994 | Tomka | |
| 5,314,934 A | 5/1994 | Tomka | |
| 5,362,777 A | 11/1994 | Tomka | |
| 5,516,815 A | 5/1996 | Buehler | |
| 5,665,152 A | 9/1997 | Bassi et al. | |
| 5,844,023 A | 12/1998 | Tomka | |
| 6,045,908 A | 4/2000 | Nakajima | |
| 6,096,809 A | 8/2000 | Lorcks | |
| 6,211,400 B1 | 4/2001 | Berghofer et al. | |
| 6,214,907 B1 | 4/2001 | Tomka | |
| 6,218,321 B1 | 4/2001 | Lorcks | |
| 6,231,970 B1 | 5/2001 | Andersen | |
| 6,235,815 B1 | 5/2001 | Lorcks | |
| 6,235,816 B1 | 5/2001 | Lorcks | |
| 6,242,102 B1 | 6/2001 | Tomka | |
| 6,586,622 B2 | 7/2003 | Berghofer et al. | |
| 6,605,657 B1 | 8/2003 | Favis et al. | |
| 6,623,854 B2 | 9/2003 | Bond | |
| 6,709,526 B1 | 3/2004 | Bailey | |
| 6,743,506 B2 | 6/2004 | Bond | |
| 6,746,766 B2 | 6/2004 | Bond | |
| 6,783,854 B2 | 8/2004 | Bond | |
| 6,818,295 B2 | 11/2004 | Bond | |
| 6,830,810 B2 | 12/2004 | Bond | |
| 6,844,380 B2 | 1/2005 | Favis et al. | |
| 6,890,872 B2 | 5/2005 | Bond | |
| 6,946,506 B2 | 9/2005 | Bond | |
| 7,851,391 B2 | 12/2010 | Bond | |
| 7,854,994 B2 | 12/2010 | Henderson-Rutgers et al. | |
| 7,994,240 B2 | 8/2011 | Pfaadt et al. | |
| 8,697,245 B2 | 4/2014 | Khemani et al. | |
| 2002/0015718 A1 | 2/2002 | Kruse et al. | |
| 2003/0077444 A1 | 4/2003 | Bond | |
| 2003/0092343 A1 | 5/2003 | Bond | |
| 2003/0148690 A1 | 8/2003 | Bond | |
| 2005/0079785 A1 | 4/2005 | Bond | |
| 2007/0082573 A1 | 4/2007 | Noda | |
| 2007/0082981 A1 | 4/2007 | Noda | |
| 2007/0082982 A1 | 4/2007 | Noda | |
| 2010/0292078 A1 | 11/2010 | Braig et al. | |
| 2010/0297458 A1* | 11/2010 | Khemani et al. | 428/480 |
| 2011/0015309 A1 | 1/2011 | Brocker | |
| 2011/0086949 A1 | 4/2011 | Mentink | |

(Continued)

FOREIGN PATENT DOCUMENTS

| | | |
|---|---|---|
| JP | 2006521431 | 9/2006 |
| JP | 2009511714 | 3/2009 |
| WO | WO2008014573 | 2/2008 |

OTHER PUBLICATIONS

Kainuma,"Determination of the Degree of Gelatinization and Retrogradation of Starch", Methods in Carbohydrate Chemistry, vol. X, John Wiley & Sons, Inc., pp. 137-141 (1994).

Bao, "Study on the Effect of Distillation Reside in Corn Polyols Industry on Thermoplastic Starch", Advanced Materials Research vols. 391-392 (2012) pp. 940-944.

*Primary Examiner* — Hui Chin

(74) *Attorney, Agent, or Firm* — Kim William Zerby

(57) ABSTRACT

The present invention relates to improvements in prevention of discoloration of thermoplastic starch materials and their blends with other thermoplastic materials.

16 Claims, No Drawings

(56) References Cited

U.S. PATENT DOCUMENTS

2011/0118390 A1 5/2011 Feron
2012/0157582 A1 6/2012 Broyles
2012/0216709 A1 8/2012 Noda
2012/0279421 A1 11/2012 Noda

* cited by examiner

THERMOPLASTIC STARCH COMPOSITIONS

FIELD OF THE INVENTION

The present invention relates to improvements in prevention of discoloration of thermoplastic starch materials and their blends with other thermoplastic materials.

BACKGROUND TO THE INVENTION

Thermoplastic starch compositions are often used to make final plastic products. The thermoplastic starch composition is heated and formed into the products using known techniques such as injection moulding, extrusion blow moulding, thermoforming, injection stretch blow moulding, cast film extrusion, blown film extrusion and fiber spinning/extrusion. Often the thermoplastic starch compositions have many of the characteristics of other plastic compositions, such as polyethylene or polypropylene, however, they have the added advantage that they can be sourced from renewable resources and, are often readily biodegradable. This provides for more environmentally friendly plastic products.

However, a problem with thermoplastic starch compositions, is the tendency for discoloration upon heating. There are various steps and processes in the formation and processing of the thermoplastic starch composition that require it to be heated. Examples include, destructuring of the starch, and heating of the thermoplastic starch composition during product forming processes such as injection molding, extrusion blow moulding, thermoforming, injection stretch blow moulding, cast film extrusion, blown film extrusion and fiber spinning/extrusion. Discoloration can be further increased when thermoplastic starch is blended with other thermoplastic materials or fillers, especially when high thermal and mechanical energy processes such as compounding are used. Discoloration can be seen as a yellow or brown tint, which is viewed as an undesirable characteristic of the end use product by the consumer. In its most extreme form, discoloration can result in black material. Discoloration can also occur in the final product if it is subjected to direct heat or UV, such as being left in direct sunlight.

The discoloration of thermoplastic starch can be attributed to numerous complex and interconnected non-enzymatic 'browning reactions'. 'Maillard-type' reactions are one type of non-enzymatic browning reaction. These reactions occur between residual amino compounds and reducing groups present in the starch compounds. This reaction occurs at intermediate temperatures and in the presence of moisture. Maillard reactions are known to be inhibited by compounds such as sulfite (sodium sulfite, sodium bisulfite, and sodium metabisulfite). Oxidation is another type of browning reaction that occurs at elevated temperatures in oxygen rich environments. Caramelization reactions are yet another non-enzymatic browning reaction that occurs in starch and other polysaccharides. Caramelization reactions are complex reactions that occur under elevated temperatures and low moisture content. Caramelization reactions are catalyzed by numerous agents and the type of caramel produced is characterized by the catalyst used. For example, type I caramels are produced under basic conditions and type II caramels are produced under basic conditions with a sulfite compound such as sodium sulfite.

Therefore, a compound such as a sulfite could lower discoloration associated with the Maillard reactions, but increase discoloration associated with Caramelization reactions, especially under conditions of high temperature and low moisture.

Caramelization reactions can be inhibited by low pH conditions. However, low pH conditions catalyze starch hydrolysis, which leads to a reduction in starch molecular weight. A reduction in starch molecular weight can result in a decrease in viscosity of the molten thermoplastic starch. This may negatively affect certain polymer processing operations such as injection stretch blow molding, extrusion blow moulding, cast film extrusion, and blown film extrusion as the low viscosity thermoplastic starch composition cannot follow the contours of the mold and so results in excessively thick and/or thin areas of the final product. It may also negatively affect the mechanical properties of the final product, such as tensile strength.

WO2008014573 discloses the use of the reducing agents sodium sulfite, sodium bisulfite and metabisulfite as anti-discoloration agents for thermoplastic starch. However, as mentioned above, sodium sulfite and sodium bisulfite are known to catalyze the formation of type II caramels especially under basic conditions, elevated temperatures, and lower moisture content. It has been found that under the elevated temperatures, high energy, and low moisture processing associated with thermoplastic starch production, these agents are not sufficient to reduce discoloration and actually contribute themselves to additional browning under certain conditions.

There is a need in the art for thermoplastic starch compositions exhibiting less discoloration during processing and in the final plastic product, than is seen using known thermoplastic starch compositions.

There is a further need for thermoplastic starch compositions that exhibit less discoloration yet also maintain a desirable molecular weight starch during processing.

It was surprisingly found that the thermoplastic starch compositions of the present invention resulted in the production of thermoplastic starch materials exhibiting less discoloration than is seen using known thermoplastic starch compositions. It was also surprisingly found that the thermoplastic starch compositions of the present invention, following extensive thermal/mechanical processing, comprised starch of a higher molecular weight, than is seen in other thermoplastic starch compositions subjected to the same processing.

SUMMARY OF THE INVENTION

The present invention is to a thermoplastic starch composition, a method of making a thermoplastic starch composition and a use of a reducing agent in a thermoplastic starch composition.

An aspect of the present invention is a thermoplastic starch composition comprising,
  from 40% to 96% by weight of the thermoplastic starch composition, of a starch;
  from 1% to 40% by weight of the thermoplastic starch composition, of a plasticizer;
and wherein;
  the thermoplastic starch composition comprises 0.01% to 5% by weight of the thermoplastic starch composition, of a reducing agent, wherein the reducing agent has a redox potential, wherein the redox potential has a value of from −50 mV to −1200 mV, preferably from −100 mV to −1200 mV, more preferably from −150 mV to −1200 mV, the redox potential being measured in an aqueous solution comprising 1% reducing agent, 1% citric acid, and 1% tribasic potassium citrate by weight of the aqueous solution, and wherein the aqueous solution is at a temperature of 80° C.

Another aspect is a method of preparing the thermoplastic starch composition comprising the steps;

adding from 1% to 40% by weight of the thermoplastic starch composition, of a plasticizer;

adding 0.01% to 5% by weight of the thermoplastic starch composition, of a reducing agent, wherein the reducing agent has a redox potential, wherein the redox potential has a value of from −50 mV to −1200 mV, preferably from −100 mV to −1200 mV, more preferably from −150 mV to −1200 mV, the redox potential being measured in an aqueous solution comprising 1% reducing agent, 1% citric acid and 1% tribasic potassium citrate by weight of the aqueous solution, and wherein the aqueous solution is at a temperature of 80° C.

adding, from 40% to 96% by weight of the thermoplastic starch composition, of a starch;

mixing the thermoplastic starch composition;

passing the thermoplastic starch composition through a compounder;

removing excess water present.

Yet another aspect of the present invention is the use of a reducing agent in a thermoplastic starch composition to reduce discoloration of a thermoplastic starch composition and material processed from the thermoplastic starch composition, wherein the reducing agent has a redox potential, wherein the redox potential has a value of from −50 mV to −1200 mV, preferably from −100 mV to −1200 mV, more preferably from −150 mV to −1200 mV, the redox potential being measured in an aqueous solution comprises, 1% reducing agent, 1% citric acid and 1% tribasic potassium citrate by weight of the aqueous solution, and wherein the aqueous solution is at a temperature of 80° C.

DETAILED DESCRIPTION OF THE INVENTION

Starch

The thermoplastic starch composition of the present invention comprises from 40% to 96% by weight of the thermoplastic composition, of a starch. In one embodiment, the thermoplastic starch composition comprises from 50% to 80%, preferably from 60% to 70% by weight of the thermoplastic composition, of a starch. Starch is a low cost naturally occurring biopolymer. Preferably, the starch is selected from the group comprising natural starch, modified starch, or mixtures thereof.

In one embodiment, the starch used in the present invention is in a native or natural state. By 'native or natural starch', we herein mean the molecular structure of the starch has not deliberately been subject to any modification by chemical or any other means. Preferably, naturally occurring starches comprise starch selected from the group comprising, corn starch (e.g. waxy maize starch), potato starch, sweet potato starch, wheat starch, sago palm starch, tapioca starch, rice starch, soybean starch, arrow root starch, bracken starch, lotus starch, cassava starch, high amylose corn starch, and commercial amylose powder, or mixtures thereof. It is advantageous that the natural starch is derived from agricultural sources, which offer the advantages of being abundant in supply, easy to replenish and inexpensive in price. Preferably, the natural starch comprises starch selected from the group comprising corn starch (including waxy maize starch), wheat starch, potato starch, and mixtures thereof. In one embodiment, the natural starch comprises corn starch. In another embodiment, the natural starch comprises waxy maize starch. Natural corn starch is favourable as it is cheaper than other natural starches such as tapioca. Furthermore, different sources of corn also present different amylose to amylopectin ratios, which can impact the mechanical properties, such as tensile strength, of the final thermoplastic starch product. In another embodiment, the corn starch can be genetically modified corn starch.

It may be preferable to use natural starch rather than modified starches, as natural starches are more economical. Natural, unmodified starch generally has a very high average molecular weight and a broad molecular weight distribution (e.g. natural corn starch has an average molecular weight of up to about 60,000,000 grams/mole).

In another embodiment, the starch used in the present invention is a modified starch. Modified starch is defined as non-substituted, or substituted, starch that has had its native molecular weight characteristics changed (i.e. the molecular weight is changed but no other changes are necessarily made to the starch). Molecular weight can be modified, preferably reduced, by any of numerous techniques which are well known in the art. These include, for example, chemical modifications of starch including, but not limited to acid or alkali hydrolysis, acid reduction, oxidative reduction, enzymatic reduction, physical/mechanical degradation (e.g. via thermo-mechanical energy input of the processing equipment), or combinations thereof. The thermomechanical method and the oxidation method offer an additional advantage when carried out in situ. The exact chemical nature of the starch and molecular weight reduction method is not critical as long as the average molecular weight is provided at the desired level or range. Such techniques can also reduce molecular weight distribution. Specific molecular ranges can impart beneficial mechanical properties to the final thermoplastic starch product.

Optionally, substituted starch can be used. Chemical modifications of starch to provide substituted starch include, but are not limited to, etherification and esterification. For example, methyl, ethyl, or propyl (or larger aliphatic groups) can be substituted onto the starch using conventional etherification and esterification techniques known in the art. Such substitution can be done when the starch is in natural granular form or after it has been destructured. The term "destructured starch" herein means starch that has lost most of its crystalline order and so no longer has its natural structure. This results in the starch having a lower average molecular weight. The degree of substitution of the chemically substituted starch is typically, but not necessarily, from about 0.01 to about 3.0, and can also be from about 0.01 to about 0.06.

Starch pre-gels can also be used. Pre-gelled starches are starches that have been partially or totally destructured in a separate process typically using water. In another embodiment, the starch is destructured during processing to produce the thermoplastic starch composition. Preferably, at least about 50% of the starch is destructured starch, more preferably at least about 80% of the starch is destructured starch, most preferably at least about 90% of the starch is destructured starch. In a most preferred embodiment, about 100% of the starch is destructured starch.

Starch can be destructured in a variety of different ways. The starch can be destructurized with a solvent. For example, starch can be destructurized by subjecting a mixture of the starch and solvent to heat, which can be under pressurized conditions and shear, to gelatinize the natural starch, leading to destructurization. Typically, water is also used as a solvent in the destructuring process.

Plasticizer

The thermoplastic starch composition comprises a plasticizer. For starch to flow and to have the characteristics when molten to allow it to be processed like a conventional thermoplastic polymer, a plasticizer needs to be present. In general, the plasticizers should be substantially compatible with the polymeric components of the present invention with which they are intermixed. As used herein, the term "substantially compatible" means when heated to a temperature above the softening and/or the melting temperature of the composition, the plasticizer is capable of forming a homogeneous mixture with the components present in the composition in which it has been mixed.

The plasticizer present during further melt processing may be the same as the solvent used to destructure the starch, as solvents can also act as plasticizers. Hence, the solvent may remain in the destructured starch component to subsequently function as a plasticizer for the starch, or may be removed and substituted with a different plasticizer in the thermoplastic starch composition. The plasticizers may also improve the process flexibility of the final products, which is believed to be due to the fact that they lower the glass transition temperature of the composition (hence less energy needs to be used during heating).

Varieties of plasticizing agents that can also act as solvents to destructure starch are described herein. These include the low molecular weight or monomeric plasticizers, such as but not limited to hydroxyl-containing plasticizers, including but not limited to the polyols, e.g. polyols such as mannitol, sorbitol, and glycerol. Water also can act as a solvent for starch, and can be used to destructure the starch too.

Plasticizers that are added to the thermoplastic starch composition, (rather than as solvents to destructure the starch and are left in the composition) can include monomeric compounds and polymers. The polymeric plasticizers will typically have a molecular weight of about 100,000 g/mol or less. Polymeric plasticizers can include block copolymers and random copolymers, including terpolymers thereof. In certain embodiments, the plasticizer is a low molecular weight plasticizer. In one embodiment, the plasticizer has a molecular weight of about 20,000 g/mol or less. In another embodiment, the plasticizer has a molecular weight of about 5,000 g/mol or less. In yet another embodiment, the plasticizer has a molecular weight of about 1,000 g/mol or less.

In one embodiment, the plasticizer is selected from the group comprising monomeric compounds and polymers, organic compounds having at least one hydroxyl group, hydroxyl polymeric plasticizers, hydrogen bonding organic compounds, aliphatic acids and mixtures thereof.

The plasticizer can be, for example, an organic compound having at least one hydroxyl group, including polyols having two or more hydroxyls. Preferably, hydroxyl plasticizers are selected from the group comprising sugars such as glucose, sucrose, fructose, raffinose, maltodextrose, galactose, xylose, maltose, lactose, mannose erythrose, and pentaerythritol; sugar alcohols such as erythritol, xylitol, malitol, mannitol and sorbitol; polyols such as glycerol (glycerin), ethylene glycol, propylene glycol, dipropylene glycol, butylene glycol, hexane triol, and the like, and polymers thereof; and mixtures thereof. Preferably, the hydroxyl plasticizers are selected from the group comprising glycerol, mannitol, sorbitol, and mixtures thereof.

Also useful herein are hydroxyl polymeric plasticizers. Preferably, hydroxyl polymeric plasticizers are selected from the group comprising poloxamers (polyoxyethylene/polyoxypropylene block copolymers), poloxamines (polyoxyethylene/polyoxypropylene block copolymers of ethylene diamine) and mixtures thereof. These copolymers are available as Pluronic® from BASF Corp., Parsippany, N.J. Suitable poloxamers and poloxamines are available as Synperonic® from ICI Chemicals, Wilmington, Del., or as Tetronic® from BASF Corp., Parsippany, N.J.

Also suitable for use herein as plasticizers are hydrogen bonding organic compounds, including those which do not have an hydroxyl group. Preferably, hydrogen bonding organic compounds are selected from the group comprising urea and urea derivatives; anhydrides of sugar alcohols such as sorbitol; animal proteins such as gelatin; vegetable proteins such as sunflower protein, soybean proteins, cotton seed proteins; and mixtures thereof. In another embodiment, plasticizers are selected from the group comprising phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other fatty acid esters which are biodegradable, and mixtures thereof. In yet another embodiment, the plasticizer is an aliphatic acid selected from the group comprising ethylene acrylic acid, ethylene maleic acid, butadiene acrylic acid, butadiene maleic acid, propylene acrylic acid, propylene maleic acid, and other hydrocarbon based acids and mixtures thereof.

Preferably, the plasticizer is selected from the group comprising glycerol, sorbitol, or mixtures thereof. Most preferably, the plasticizer is glycerol.

Other non-limiting examples of plasticizers include Ecoflex, available from BASF Corp or other equivalent plasticizing polyesters.

The plasticizer of the present invention is present from 1% to 40% by weight of the thermoplastic starch composition. This concentration includes all plasticizer present in the composition, including any plasticiser that has been carried over following destructuring of the starch, where it acted as a solvent.

Reducing Agent

The thermoplastic starch composition of the present invention comprises 0.01% to 5% by weight of the thermoplastic starch composition, of a reducing agent. By reducing agent we herein mean a compound capable of reducing another chemical species, itself being oxidized in the reaction. A reducing agent is characterized by its redox potential, herein reported in mV. The full method for determining the redox potential of the reducing agent is detailed under the heading Method A.

The thermoplastic starch compositions of the present invention comprise a reducing agent having a redox potential, wherein the redox potential has a value from −50 mV to −1200 mV, preferably from −100 mV to −1200 mV, more preferably from −150 mV to −1200 mV, the redox potential being measured in an aqueous solution comprising 1% reducing agent, 1% citric acid, and 1% tribasic potassium citrate; by weight of the aqueous solution, and wherein the aqueous solution is at a temperature of 80° C.

Preferably, the reducing agent is a sulfur-comprising reducing agent. More preferably, the sulfur-comprising reducing agent is selected from the group comprising sulfinic acid derivatives or salts thereof, sulfonic acid derivatives or salts thereof, or mixtures thereof.

Sulfinic acid derivatives or salts thereof have the general formula $MSO_2$, wherein R is selected from the group comprising aliphatic groups, aromatic groups, hydroxyl groups, amino groups, imino groups, amino-imino groups, thiol groups, $-MSO_2$, and M is selected from the group consisting of H, $NH_4^+$, or monovalent metal ion. In a preferred embodiment, the sulfinic acid derivative has the general formula;

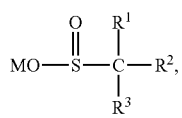

wherein, M is selected from the group consisting of H, $NH_4^+$, monovalent metal ion or a divalent metal ion; $R^1$ is selected from the group consisting of OH or $NR^4R^5$, wherein $R^4$ and $R^5$ are independently H or $C_1$-$C_6$ alkyl groups; $R^2$ is selected from the group consisting of H, alkyl group, alkenyl group, cycloalkyl group or aryl group, each group having 1, 2 or 3 substituents selected from the group consisting of $C_1$-$C_6$-alkyl, OH, O—$C_1$-$C_6$-alkyl, halogen and $CF_3$; $R^3$ is selected from the group consisting of COOM, $SO_3M$, $COR^4$, $CONR^4R^5$ or $COOR^4$, wherein M, $R^4$ and $R^5$ are defined as above, and wherein where $R^2$ is an aryl group, $R^3$ is H. These structures can be produced following the teachings of U.S. Pat. No. 6,211,400 involving adducts of sodium dithionite and aldehydes. In one embodiment, the sulfinic acid derivatives or salts thereof are selected from the group comprising sodium hydroxymethylsulfonate, disodium 2-hydroxy-2-sulfinatoacetic acid, sodium dithionite, thiourea dioxide and mixtures thereof.

Sulfonic acid derivatives or salts thereof have the general formula, $MSO_3R$ where R is selected from the group comprising aliphatic groups, aromatic groups, hydroxyl groups, amino groups, imino groups, amino-imino groups, thiol groups, -$MSO_2$, and M is selected from the group consisting of H, $NH_4^+$, or monovalent metal ion. In one embodiment, the sulfonic acid derivative is disodium 2-hydroxy-2-sulfonatoacetic acid.

In one embodiment, the sulfur-comprising reducing agent is selected from the group comprising sodium hydroxymethylsulfonate, disodium 2-hydroxy-2-sulfinatoacetic acid, sodium dithionite, thiourea dioxide, disodium 2-hydroxy-2-sulfonatoacetic acid, and mixtures thereof.

In another embodiment, the sulfur-comprising reducing agent is selected from the group comprising disodium 2-hydroxy-2-sulfinatoacetic acid, disodium 2-hydroxy-2-sulfonatoacetic acid, and mixtures thereof.

The sulfur-comprising reducing agent of the present invention is present between about 0.01% and 5%, preferably between 0.05% and 2%, more preferably between 0.05% and 1%, even more preferably between 0.1% and 0.5% by weight of the thermoplastic starch composition.

While not wishing to be bound by theory, it is believed that the reducing agents of the present invention minimize Maillard and oxidation type reactions, and so reduce the amount of discoloration in both the thermoplastic starch composition and articles made from the thermoplastic starch composition. However, unlike the reducing agents described in the prior art, the reducing agents of the present invention also minimize discolouration due to caramelization reactions. Furthermore, it is believed that the reducing agents of the present invention reduce or minimize starch hydrolysis at low pH, thus enabling low pH to also be used to minimize caramelization based discolouration.

Acidic Agent

In one embodiment, the thermoplastic starch compositions comprise an acidic agent or acid/base conjugate pair. Preferably, the acidic agent is selected from the group comprising citric acid, tribasic potassium citrate or mixtures thereof.

Caramelization reactions can be inhibited by lowering pH during the heating stage of starch processing. However, lower pH has the potentially negative effect of catalyzing starch hydrolysis. It was surprisingly found that the presence of the reducing agents of the present invention also reduced the hydrolysis associated with processing of thermoplastic starch compositions especially when low pH/acidic processing conditions were used. Therefore, low pH combined with the reducing agents of the present invention can also be used to more effectively minimize caramelization browning reactions whilst minimizing the negative impact on the molecular weight of the starch.

Other Ingredients

Optionally, other ingredients may be incorporated into the thermoplastic starch composition. These optional ingredients may be present in quantities of from 49% or less, or from 0.1% to 30%, or from 0.1% to 10% by weight of the composition. The optional materials may be used to assist in processing of the thermoplastic starch composition and/or to modify physical properties such as elasticity, tensile strength, modulus, or other properties or benefits of the final product. Other properties or benefits include, but are not limited to, stability including oxidative stability, brightness, color, flexibility, resiliency, processing aids, viscosity modifiers, and odor control. A preferred processing aid is magnesium stearate. A preferred odor control agent is zinc carbonate. Another optional material that may be desired, particularly in the starch component, is ethylene acrylic acid, commercially available as Primacor by Dow.

In one embodiment, the thermoplastic starch comprises another thermoplastic material. In a preferred embodiment, the thermoplastic starch composition comprises a polyolefin material, selected from the group comprising polyethylene, polypropylene, polyethylene terephthalate and mixtures thereof. In another embodiment, the thermoplastic starch material comprises a polyolefin material, wherein the polyolefin material is sourced from renewable resources such as cellulose, starch and/or sugar containing crops.

Preparation of the Thermoplastic Starch Composition

Thermoplastic starch compositions of the present invention can be produced in numerous ways to provide a destructured starch combined with a plasticizer. Water in some form is typically used as the destructuring agent. Preferably, the thermoplastic starch compositions of the present invention are produced using either the dry process or the slurry process.

In the dry process method, water naturally present in the starch is used as the primary destructuring agent. In this process, additional water is not normally added and the starch is fed as a powder and/or a mixture with the plasticizer. Typically, chemically modified starches are used in this type of process to enable easier destructuring due to the lack of extra water, which would be necessary to facilitate destructuring of natural or unmodified starch.

In the slurry process method, excess water is added to the starch to facilitate destructuring. Typically, the starch, water, and optionally the plasticizer are premixed into the form of a slurry. Typically, natural starch or "lightly modified starch" are used in this process due to their lower cost and due to the fact that excess water is added, destructuring is easier than in the dry process. Lightly modified starches are starches that have not been extensively modified, therefore, they still need to be destructured. In this process, the extra water must be removed, which requires more heat energy to be expended to produce the desired product. Therefore, thermoplastic starch compositions prepared using slurry process are more subject to discoloration issues than thermoplastic starch compositions made using the dry process.

The method of preparing the thermoplastic starch compositions of the present invention comprises the steps of;

adding from 1% to 40% by weight of the thermoplastic starch composition, of a plasticizer;

adding 0.01% to 5% by weight of the thermoplastic starch composition, of a reducing agent, wherein the reducing agent has a redox potential, wherein the redox potential of the reducing agent is from −50 mV to −1200 mV, preferably from −100 mV to −1200 mV, more preferably from −150 mV to −1200 mV, the redox potential being measured in an aqueous solution comprising, 1% reducing agent, 1% citric acid, and 1% tribasic potassium citrate by weight of the aqueous solution, and wherein the aqueous solution is at a temperature of 80° C.

adding, from 40% to 96% by weight of the thermoplastic starch composition, of a starch;

mixing the thermoplastic starch composition;

passing the thermoplastic starch composition through a compounder;

removing excess water present.

During the process, the thermoplastic starch composition is passed through a compounder, where it is subjected to thermal and mechanical energy typically under elevated pressure to keep the bound water in a predominately bound state. Following this, bound water is largely removed through application of thermal and mechanical energy under standard atmospheric conditions and/or vacuum. The plasticizer acts to plasticize the thermoplastic starch composition, and the starch is destructured. The final material is a thermoplastic starch composition that can be further combined with other natural or synthetic polymers or can be used in the current form to produce extruded and/or shaped products.

The slurry process differs from the dry process in that water is added to aid with the hydrolysis of the starch, and to make the thermoplastic starch composition easier to handle during processing. Preferably, the water is added to the thermoplastic starch composition before the thermoplastic starch composition is mixed. Preferably, sufficient water is added to provide the thermoplastic starch composition with a viscosity that allows it to flow or be pumped into the compounder, making it easier to handle the thermoplastic starch composition during processing. The amount of water will differ depending on the type and amount of the other ingredients added.

Since it is a slurry, the pH can be measured (when the flow properties of the slurry range from 'water-like' to more viscous 'paste-like' consistency), and more accurately adjusted at this point than in the dry process, where it is impossible to measure the pH of the dry ingredients. In one embodiment, the pH of the thermoplastic starch composition is adjusted to below 6, preferably below 4. In one embodiment, the acidic agent or acid/base conjugate pair is added after the plasticizer is added, but before the reducing agent is added. Preferably, the acidic agent or acid/base conjugate pair is added in sufficient quantity to adjust the pH of the thermoplastic starch composition to less than 6, preferably less than 4. In one embodiment, the pH of the thermoplastic starch is adjusted to between 6 and 1, preferably between 4 and 2.

In the case of the slurry process, most unbound and bound water are removed following passing of the thermoplastic starch composition through the compounder through application of thermal and mechanical energy under standard atmospheric conditions and/or vacuum.

Processing of the Thermoplastic Starch Composition

Thermoplastic starch compositions may be processed into complex forms by various processes, notably moulding processes, extrusion processes, etc. In these processes the thermoplastic starch composition is typically heated to a temperature above its melt temperature $T_m$, so that the thermoplastic starch composition can be formed into the desired shape. Preferred processing temperatures are between about 60° C. and about 300° C. In moulding processes, a mould which generally comprises two or more parts is provided, which can be closed to form a mould cavity. In injection moulding processes the thermoplastic starch composition is injected into the mould cavity. In blow moulding processes a heated preform or parison is placed within the mould and air is injected into the preform or parison so that it expands within the mould cavity to form a hollow body. In extrusion processes the heated thermoplastic starch composition is forced under pressure through an extrusion die. Many variations on these basic processes are practiced in industry, such as, for example, injection stretch blow moulding, extrusion blow moulding, film casting, film blowing, fiber spinning, etc.

Use of the Reducing Agent

One aspect of the present invention is the use of a reducing agent in a thermoplastic starch composition to reduce discoloration of a thermoplastic starch composition and material processed from the thermoplastic starch composition, wherein the reducing agent has a redox potential, wherein the redox potential has a value from −50 mV to −1200 mV, preferably from −100 mV to −1200 mV, more preferably from −150 mV to −1200 mV, the redox potential being measured in an aqueous solution comprising, 1% reducing agent, 1% citric acid and 1% tribasic potassium citrate by weight of the aqueous solution, and wherein the aqueous solution is at a temperature of 80° C.

Method A: Measurements of Redox Potential and pH

Approximately 20 g of citric acid and 20 g of tribasic potassium citrate were added to 1960 g of deionised water (resistance was greater than 17 mΩ). The mixture was stirred for approximately 15 minutes and heated to 80° C. The pH and redox potential were measured. Redox potential was measured using an EcoSense ORP 15 probe manufactured by YSI. The redox probe had been calibrated using a saturated solution of Quinhydrone at pH 4. The pH was measured using an EcoSense pH 10 probe manufactured by YSI. The pH probe was calibrated with PerpHect buffer solutions from Orion. Specifically, Buffer 4, 7, and 10 traceable to NIST standards were used. Approximately 100 g of the buffered solution was added to a 400 ml beaker. A small stir bar was added and the flask placed on a standard lab hot plate stirrer that actively controlled the temperature to 80° C. Temperature and redox potential were measured until both stabilized. 1 g of the reducing agent was added to the flask whilst stirring. The mixture was allowed to stir for 30 seconds at 80° C. while measuring redox and pH. After the initial 30 seconds, the redox potential and pH were recorded. The redox and pH electrodes were then rinsed with fresh deionised water.

Method B: Production of Flat Discs for Optical Measurements

Thermoplastic starch or Thermoplastic starch and other thermoplastic samples were pressed into thin films using a JRD Compression Molder with heated platens. The heated platens of the compression molder were equilibrated to 170° C. Approximately 2.5 g of a thermoplastic starch composition was placed on a piece of Teflon coated woven fiberglass sheet (the dimensions of the fiberglass sheet were approximately six inches square). The thermoplastic starch composition was heaped into a single pile with a base diameter of about 1.5 inches. A stainless steel shim was used to assure a relatively uniform thickness. The outside dimension of the shim was approximately six inches square. A rectangular area was present inside the shim with dimensions of approximately 10 cm by 13 cm. The shim was placed around the Thermoplastic starch composition pile so that the pile was in the approximate center of the open rectangular area of the shim. Another piece of Teflon coated woven fiberglass was place on top of the pile. The fiberglass sheeting allows for the easy removal of the compressed thermoplastic starch composition. The shimmed thermoplastic starch composition sample was then placed inside the compression and the heated platens were slowly brought together using the hydraulic control of the molder. The thermoplastic starch composition sample was then allowed to equilibrate at 170° C. for 90 seconds. After 90 seconds the sample was compression molded by rapidly increasing the pressure of the shimmed thermoplastic starch composition sample to approximately 40 Bar. After 30 seconds the pressure was again rapidly increased back to 40 Bar for an additional 30 seconds. After 60 seconds of compression, the pressure was released and the samples were removed and allowed to cool. The compressed thermoplastic starch sample was then removed from the fiberglass sheeting and was placed between two sheets of paper and was stored in a reclosable plastic bag to minimize moisture absorption. The compressed thermoplastic starch sample was allowed to equilibrate to room temperature for at least sixteen hours before color measurements were taken.

Method C: Color Measurements of Flat Discs

Color measurements were obtained with a Minolta Spectrophotometer, Model CM580d. The 'white' portion of a Leneta card was used as a common background and as the reference point for ΔE calculations. ΔE is the color difference between a sample color and a reference color. Color measurements were taken using a D65 illuminant and a 10° observer. A minimum of three measurements were taken for each of the compressed thermoplastic starch composition samples. L, a, b values (Hunter 1948 L, a, b color space) were averaged and reported along with ΔE values. ΔE values for the pure white Leneta card are zero and positive deviations from zero indicate increased discoloration. Those skilled in the art will know how to calculate the ΔE value. The efficacy of a given anti-discoloration agent is related to the change in ΔE relative to a control sample produced using identical materials and process but without reducing agent and/or pH buffer. The color improvement index for the sample, ζ, is calculated from the following equation:

$$\varsigma = \frac{(\Delta E_{control} - \Delta E_{agent})}{\Delta E_{control}} \cdot 100$$

Where $\Delta E_{control}$ is the ΔE of the thermoplastic starch composition control produced under a given composition and process but without any reducing agent and $\Delta E_{agent}$ is the ΔE of the thermoplastic starch composition produced using the same composition and process but with reducing agent present. The value of ζ can vary from 100% for a perfectly white material to 0% for a material having the same color as the control to less than 0% for a material of greater discoloration than the control.

Method D: Method for Producing Destructured Starch Using a Dry Process

A mixture of 1.5 kg of starch (ethoxylated corn starch from Grain Processing Corporation (GPC) K-92F), 1.0 kg of sorbitol plasticizer (ADM Tech Grade), 25 g of magnesium stearate (Spectrum Chemicals NC/FCC high purity grade), and optionally 25 g reducing agent were mixed in a high speed Henchel mixer operating at 10,000 RPM for five minutes. The mixture was then added to the feed throat of a 25 mm BP twin-screw compounder outfitted with three degassing areas and 10 temperature control zones. The first degassing area was exposed to ambient conditions, whilst the other degassing areas were exposed to −28 cm Hg. The feed zone was set to 85° C. while the remaining zones were set to approximately 150° C. The screw was set to 300 RPM. The strands exiting the die were quenched in air and pelletized.

Method E: Method for Producing Destructured Starch Using a Slurry Process 3.1 kg of de-ionized water was mixed with 2.24 kg of glycerol and stirred using a pneumatic paddle mixer operating at 150 RPM. Optionally, 9.5 g of citric acid and 0.5 g of tribasic potassium citrate buffer was added to the water/glycerol mix and stirred for 1 minute. Optionally, 30 g of reducing agent of the present invention was added to the water/glycerol slurry while stirring. After 1 minute, 4 kg of starch (either modified starch from Tate and Lyle, Ethylex 2005S or natural corn starch from Tate and Lyle, Pure Food Grade Powder) was added to the water/glycerol solution. Following 10 minutes of mixing at room temperature, the aqueous mixture was gravity fed to the hopper of a ZSK 30 mm twinscrew extruder. The feed rate was adjusted to 1.8 kg/h. The twinscrew contained 12 temperature controlled barrel zones and one temperature controlled die zone. The temperatures were set according to the following temperature profile (° C.);

| 1 | 2 | 3 | 4 | 5 | 6 | 7 | 8 | 9 | 10 | 11 | 12 | DH |
|---|---|---|---|---|---|---|---|---|----|----|----|----|
| Ambient | 95 | 100 | 104 | 138 | 161 | 161 | 161 | 161 | 161 | 161 | 161 | 161 |

Those skilled in the art will understand how to set the temperature profile and operate the extruder. The screw speed was set to 100 RPM. The twinscrew contained distributive and dispersive mixing elements between zones 1 and 3. An ambient pressure vent was contained in zone 4 followed by additional distributive and dispersive mixing in zones 7 through 10. Another ambient pressure vent was contained in zone 11. Zone 12 contained metering/conveying elements followed by a three holes strand die. Material exiting the die was air cooled and pelletized.

Method F: Method for Producing Thermoplastic Starch Compositions Blended with Other Thermoplastic Materials 2000 g of thermoplastic starch produced by Method D were dry blended with 1800 g of Dow 640i LDPE and 200 g of Dow Primacor 3460. The mixture was added to the feed throat of a BP twin-screw compounder operating at 300 RPM. The feed zone was set to 80° C. and the remaining zones were set to 170° C. The strands exiting the die were quenched in a water bath and pelletized.

Method G: Method for Measuring the Molecular Weight of the Starch Present in the Thermoplastic Starch Composition Prior to testing samples of the present invention, a polysaccharide of known molecular weight was tested. Specifically, a low molecular weight narrow dispersed polysaccharide (47,300 MW) from Polymer Laboratories was used. 0.024 g of the polysaccharide standard and 6.55 g of the DMSO mobile phase were added to a scintillation vial. This was left overnight, after which the mixture was gently swirled then filter with a 5 μm nylon syringe filter and injected into an autosampler vial. Standard concentration was set to be about 4 mg/ml.

If raw starch material (not de-structured) was used, 0.06 g of the sample was added to a 2 oz wide mouth jar. 22 g of the mobile phase were added and stirred using a stir bar for 5 minutes. The mixture was heated for 1 hour in an 85° C. oven. The samples were removed and allowed to sit overnight at room temperature. The mixture was filtered through a 5 μm nylon syringe filter into an autosampler vial.

If thermoplastic starch was used, 3 mg/ml of the thermoplastic starch in mobile phases (those skilled in the art would know how to prepare a mobile phase), was added to a 2 oz wide mouth jar. (Example: a 40% thermoplastic starch sample would have 0.15 g thermoplastic starch and 22 g mobile phase). The above procedure was then followed.

Molecular weight was determined using the following equipment and method. A Waters 600E HPLC pump/system controller, a 717 autosampler, a column heater & controller, an in-line degasser, an Optilab DSP interferometric refractometer, and a DAWN IOS 18 angle laser light detector were used. The column was a PL Gel 20 μm Mixed A type with a length of 600 mm and an inside diameter of 7.5 mm. The guard column was a PL Gel 20 μm that was 50×75 mm. Those skilled in the art would know how to operate the equipment. The following settings and parameters were used; Column Temperature: 55° C., Internal Temperature: 50° C., Flow Rate: 1 ml/min, Run Time: 30 min, Laser Wavelength: 690 nm, Cell type: K5, Injection Volume: 200 μl, Mobile Phase: DMSO with 0.1% LiBr added, do/dc: 0.066. Mw is calculated from the following equation:

$$M_w = \frac{\sum_{i=1}^{\#} n_i \cdot MW_i^2}{\sum_{i=1}^{\#} n_i \cdot MW_i}$$

$MW_i$ is the molecular weight of a particular polymer species, i. $n_i$ is the number of that particular species having a $MW_i$, and # is the total number of species in the polyethylene material.

During processing, the molecular weight of the starch is typically reduced due to chain scission and other complex reactions. Hydrolysis results in a reduction in molecular weight and this is catalyzed by low pH. An observed drop in Mw following processing is predominately caused by hydrolysis of the starch. The ability of the starch to maintain Mw during processing is called the material process stability and is quantified by the stability index, τ, where τ is calculated from the following equation:

$$\tau = \left[\frac{(Mw_{processed} - Mw_{virgin})}{Mw_{virgin}}\right]$$

Where $Mw_{virgin}$ is the weight average molecular weight of the initial starch fed to the process, $Mw_{processed}$ is the weight average molecular weight of the starch after processing. A τ of greater than 0% indicates an increase in molecular weight during processing and may be associated with chain extension or crosslinking. A τ less than 0% indicates a decrease in molecular weight during processing and is likely associated with hydrolysis. The later is not preferred especially in the case of products produced from extrusion blow molding, injection stretch blow molding, cast film, and blown film.

EXAMPLES

For all examples, the redox potential of the reducing agent was measured using Method A. The thermoplastic starch compositions were formed into pellets using Method D or E, and transformed into thin discs using Method B. Colour was measured using Method C.

Examples for Thermoplastic Starch Compositions Produced by the Dry Process and Using Low Molecular Weight Ethoxylated Starch Thermoplastic starch compositions were prepared using Method D. Low molecular weight starch K-92F from Grain Processing Corporation was used, and where applicable, reducing agent was added. A control was produced to establish the color of a thermoplastic starch produced without reducing agent. Results can be seen in Table 1 as Examples 1-4. Examples of thermoplastic starch compositions comprising reducing agents outside of the scope of the present invention are shown in Table 2, as Examples Comp A-C.

Examples for Thermoplastic Starch Compositions Produced by the Slurry Process and Using Low Molecular Weight Ethoxylated Starch Thermoplastic starch compositions were prepared using Method E. Low molecular weight starch Ethylex 2005S from Tate & Lyle was used, and where applicable, the reducing agent was added. A control was produced to establish the color of a thermoplastic starch composition produced without reducing agent. Results are shown in Table 1 as Example 5.

Examples for Thermoplastic Starch Compositions Produced by the Slurry Process and Using Natural Corn Starch Thermoplastic starch compositions were prepared using Method E. Natural corn starch, pure food grade powder from Tate & Lyle was used, and where applicable, reducing agent was added. Controls were produced to establish the color of a thermoplastic starch compositions produced without reducing agent. The redox potential of the reducing agent was measured using Method A. The thermoplastic starch compositions were formed into pellets using Method D, and transformed into thin discs using Method B. Colour was measured using Method C. Results are shown in Table 1 as Examples 6 and 7. An Example of a thermoplastic starch composition comprising reducing agent outside of the scope of the present invention is shown in Table 2, as Example Comp D.

TABLE 1

| Example | Process Method | Starch Type | Reducing Agent | Redox Potential | Color Improvement Index ζ |
|---|---|---|---|---|---|
| 1 | D | modified | disodium 2-hydroxy-2-sulfinatoacetic acid | −280 | 52% |
| 2 | D | modified | thiourea dioxide | −195 | 69% |
| 3 | D | modified | 2-hydroxy-2-sulfonatoacetic acid | −285 | 63% |
| 4 | D | modified | sodium hydroxymethyl-sulfinate dihydrate | −450 | 72% |
| 5 | E | modified | sodium hydroxymethyl sulfinate dihydrate | −450 | 53% |
| 6 | E | natural | sodium hydroxymethyl sulfinate dihydrate | −450 | 39% |
| 7 | E | natural | disodium 2-hydroxy-2-sulfinato/sulfonato acetic acid 3:1 ratio mixture | −250 | 34% |

TABLE 2

| Comparative Example | Process Method | Starch Type | Reducing Agent | Redox Potential | Color Improvement Index ζ |
|---|---|---|---|---|---|
| Comp A | D | modified | taurine | +145 | −95% |
| Comp B | D | modified | cysteic acid | +200 | −5% |
| Comp C | D | modified | sodium sulfite | 0 | 16% |
| Comp D | E | natural | sodium metabi sulfite | +75 | 4% |

As can be seen from Tables 1 and 2, thermoplastic starch compositions comprising reducing agents according to the present invention exhibited improved reduction of discoloration as indicated by the colour improvement index, than in the absence of reducing agent or as compared to reducing agents outside of the scope of the present invention.

Examples of Thermoplastic Starches According to the Present Invention Blended with Other Thermoplastics Blends of thermoplastic starch compositions produced by Method D and another thermoplastic were produced using Method F. Example 8 shown in Table 3 was produced using a thermoplastic starch composition containing sodium hydroxymethylsulfonate dihydrate via Method D.

TABLE 3

| Example | Process Method | Starch Type | Reducing Agent | Redox Potential | Color Improvement Index ζ |
|---|---|---|---|---|---|
| 8 | D | modified | sodium hydroxymethyl-sulfinate dihydrate | −450 | 37% |

Effect of the Reducing Agent on the MW of the Starch Present in the Thermoplastic Starch Composition Thermoplastic starch compositions were prepared using the slurry process (Method E) at low pH with and without reducing agent to determine the impact on the molecular weight of the starch. Natural corn starch, Pure Food Grade Powder from Tate & Lyle was used. Results can be seen as Example 9 in Table 4. Comparative Example Comp E is also shown, which contains no reducing agent. The stability index τ was measured according to Method G.

TABLE 4

| Example | Reducing Agent | pH | Mw | τ |
|---|---|---|---|---|
| 9 | sodium hydroxymethylsulfinate dihydrate | 2.8 | 19.9 | +42% |
| Comp E | none | 2.5 | 2.0 | −77% |

As can be seen from Table 4, compositions according to the present invention exhibited higher molecular weight starch, as indicated by the stability index τ, than a composition not comprising a reducing agent according to the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for reducing discoloration of thermoplastic starch compositions, said method comprising:
   including a reducing agent as an ingredient in said thermoplastic starch compositions, wherein the reducing agent has a redox potential from about −50 mV to about −1200 mV, the redox potential being measured in an aqueous solution at a temperature of about 80° C., said aqueous solution comprising about 1% reducing agent, about 1% citric acid, and about 1% tribasic potassium citrate by weight of the aqueous solution.

2. The method of claim 1, wherein the reducing agent is a sulfur-comprising reducing agent.

3. The method of claim 2, wherein the sulfur-comprising reducing agent is selected from the group consisting of sulfinic acid derivatives or salts thereof, sulfonic acid derivatives or salts thereof, and mixtures thereof.

4. The method of claim 3, wherein the sulfur-comprising reducing agent is selected from the group consisting of sodium hydroxymethylsulfonate, disodium 2-hydroxy-2-sulfinatoacetic acid, sodium dithionite, thiourea dioxide, disodium 2-hydroxy-2-sulfonatoacetic acid, and mixtures thereof.

5. The method of claim 4, wherein the sulfur-comprising reducing agent is selected from the group consisting of disodium 2-hydroxy-2-sulfinatoacetic acid, disodium 2-hydroxy-2-sulfonatoacetic acid, and mixtures thereof.

6. The method of claim 1, wherein the redox potential of the reducing agent has a value of from about
   −100 mV to about −1200 mV.

7. The method of claim 6, wherein the redox potential of the reducing agent has a value of from about
   −150 mV to about −1200 mV.

8. The method of claim 1, wherein said thermoplastic starch composition comprises:
   (a) from about 40% to about 96% starch, by weight of the thermoplastic starch composition;
   (b) from about 1% to 40% plasticizer, by weight of the thermoplastic starch composition; and
   (c) from about 0.01% to about 5% reducing agent, by weight of the thermoplastic starch composition.

9. The method of claim 8, wherein the starch is selected from the group consisting of natural starch, modified starch, and mixtures thereof.

10. The method of claim 9, wherein the starch is a natural starch.

11. The method of claim 9, wherein the starch is a modified starch.

12. The method of claim 8, wherein the thermoplastic starch composition comprises another thermoplastic material.

13. The method of claim 12, wherein the other thermoplastic material is selected from the group consisting of polyethylene, polypropylene, polyethylene terephthalate and mixtures thereof.

14. The method of claim 13, wherein the thermoplastic starch composition additionally comprises added water.

15. The method of claim 13, wherein the pH of the thermoplastic starch composition is adjusted to less than about 6.

16. The method of claim 15, wherein the pH of the thermoplastic starch composition is adjusted to less than about 4.

* * * * *